J. WAMPFLER, Jr.
AUTOMOBILE SIGNAL.
APPLICATION FILED AUG. 25, 1919.

1,334,979.

Patented Mar. 30, 1920.
2 SHEETS—SHEET 1.

Inventor
Jacob Wampfler, Jr.
By
Attorney

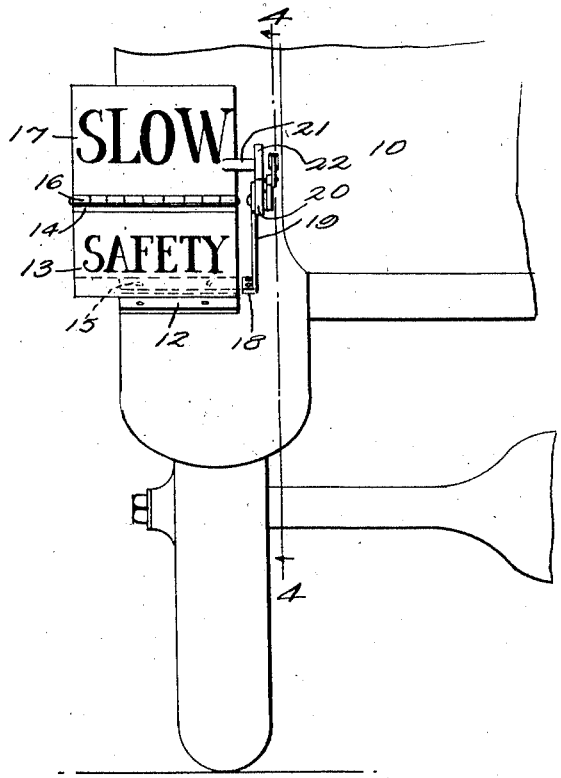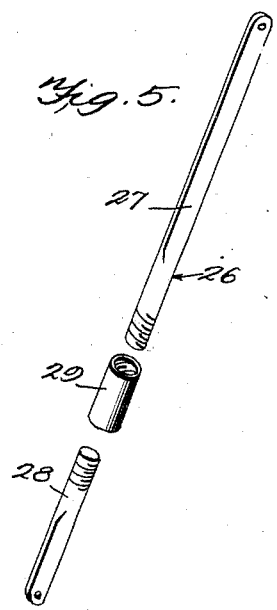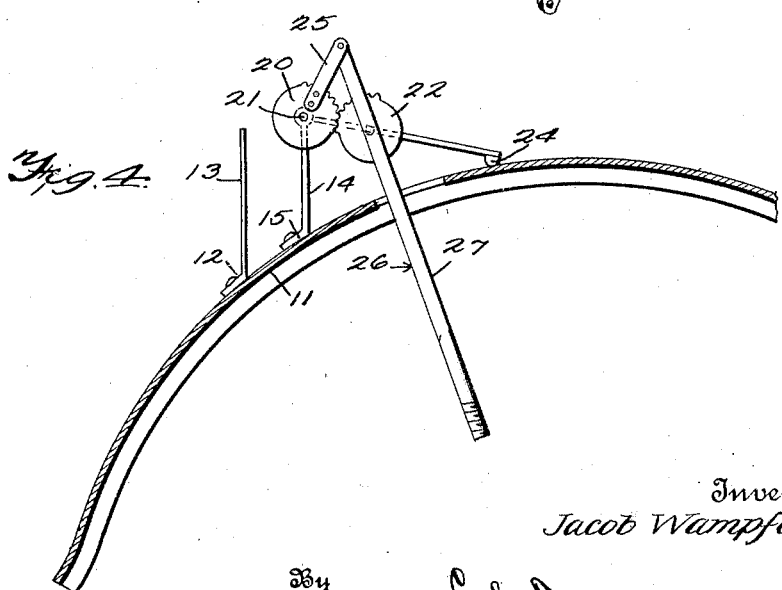

UNITED STATES PATENT OFFICE.

JACOB WAMPFLER, JR., OF LOWELLVILLE, OHIO.

AUTOMOBILE-SIGNAL.

1,334,979.  Specification of Letters Patent.  Patented Mar. 30, 1920.

Application filed August 25, 1919. Serial No. 319,605.

*To all whom it may concern:*

Be it known that I, JACOB WAMPFLER, Jr., a citizen of the United States, residing at Lowellville, in the county of Mahoning and State of Ohio, have invented certain new and useful Improvements in Automobile-Signals, of which the following is a specification.

This invention relates to new and useful improvements in automobile signals and more particularly to the type of signal used to indicate at the rear of the automobile when the operator of the automobile intends to slow down or stop.

An important object of the invention is to provide such a signal normally hidden from view, but having means to attract attention to the point at which the signal will become visible.

A further object of the invention is to provide such a signal, the operation of which is not dependent upon the memory of the driver of the vehicle.

Other objects and advantages of the invention will be apparent during the course of the following description.

Figure 1:
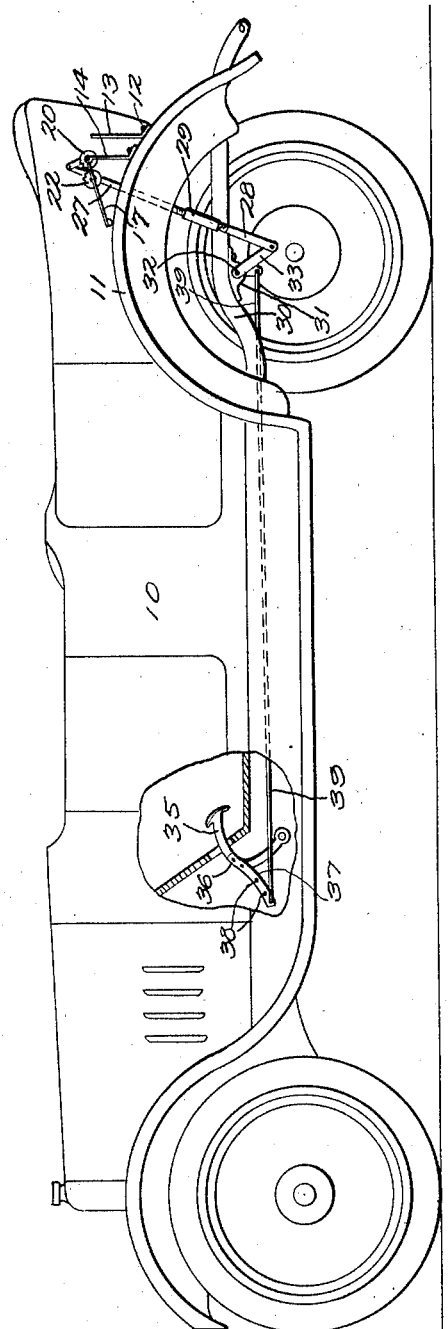
Figure 2:
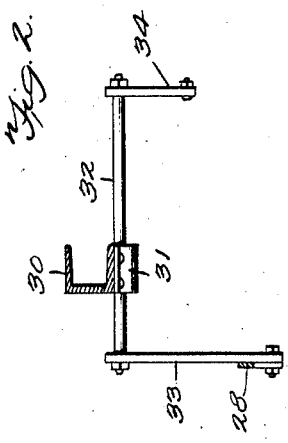

In the accompanying drawings forming a part of this specification and in which like numerals are employed to designate like parts throughout the same, Figure 1 is a side elevation of an automobile embodying my invention, parts being broken away to more clearly illustrate the invention, Fig. 2 is a section taken on line 2—2 of Fig. 1, Fig. 3 is a fragmentary rear elevation of an automobile, showing the signal in the visible position, Fig. 4 is a section taken on line 4—4 of Fig. 3, and, Fig. 5 is a detached perspective of the various parts of an extensible link forming a portion of my invention.

Referring now more particularly to the drawings, the numeral 10 indicates an automobile as a whole, the numeral 11 indicating the rear mud guard thereof. Secured to the mud guard, as at 12, is a vertical plate 13, bearing upon its face the word "Safety". Just forward of the plate 13 is a second plate 14, secured to the mud guard, as at 15. Hinged to the plate 14, as at 16, is a pivotal plate 17, bearing upon its face, the words "Slow" or "Stop".

Secured to the mud guard 11 as at 18, is a vertical standard 19, to which a segmental gear or mutilated gear 21 is pivoted, as at 20, the pivot of the gear 21 being alined with the hinge connecting the plates 14 and 17. Secured to the plate 22 is a lug 21, bearing upon its outer end a segmental gear 22. The gear 22 is fixed with relation to the plate 17. To prevent the plate 17 from marking the mud guard when it assumes the position shown in Figs. 1 and 4, it is provided at its free end with a striking pad 24, of some soft material, such as rubber or felt.

Secured to the mutilated gear 21 is a radial arm 25, to which is pivotally connected an extensible link, designated as a whole by the numeral 26. This link comprises end members 27 and 28, supplied upon their adjacent ends with right hand and left hand threads respectively, these threads being received by the interior right hand and left hand threads of a socket 29. As is obvious, this construction allows of adjustment of the link and consequently of adjustment of the plate 17 through the medium of the gears 21 and 22.

Secured to the frame 30 of the automobile is a suitable bearing 31, in which is mounted a horizontal rock shaft 32, having a long arm 33, which is pivotally connected to the lower end of the extensible link 29. Upon the opposite end of the shaft 32 is mounted a short arm 34.

Secured to the clutch pedal 35 of the automobile as at 36 is a forwardly extending bracket 37. This bracket is provided with a plurality of openings 38, adapted to interchangeably receive the forward end of a connecting link 39, the rear end of which is pivotally connected with the short arm 34, secured to the shaft 32.

The operation of my device is as follows:

When the automobile is traveling, the plate 17 is hidden from view behind the plate 13, as indicated in Fig. 1 at 14, attention, however, is directed to the point at which this plate will appear by the word "Safety" upon the plate 13. In event a stop is necessary, the first operation in stopping a car is necessarily that of the releasing of the clutch and consequently when the clutch is released, the plate 17 is lifted to the position shown in Fig. 3.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In an automobile signal, a stationary vertical plate secured to the fender of an automobile, a second plate hingedly connected to the upper edge of said first named plate, and adapted to be hidden from view thereby when the automobile is traveling under power, and means for elevating said plate when the clutch of said automobile is released, said plate being provided upon the under side of the free edge thereof with a pad of nonabrasive material adapted to contact said fender.

2. In an automobile signal, a vertical plate secured to the fender of the automobile, a second plate hingedly connected thereto and having its free edge provided with a strip of nonabrasive material normally contacting the fender whereby said second plate is normally concealed by said first named plate, a standard secured to said fender, a mutilated gear pivotally mounted thereon, the pivot of said gear being alined with the hinge connecting said plates, and a fixed gear carried by said second plate.

3. In an automobile signal, a vertical plate secured to the fender of the automobile, a second plate hingedly connected thereto and normally concealed by said first named plate, the free edge of said second plate normally contacting said fender, means carried by said free edge for preventing said edge from abrading the fender, a standard secured to said fender, a mutilated gear pivotally mounted thereon, the pivot of said gear being alined with the hinge connecting said plates, a fixed gear carried by said second plate, a radial arm secured to said mutilated gear, a shaft pivotally connected to the frame of the automobile provided upon its ends with arms, a bracket secured to the clutch pedal of the automobile and provided with a plurality of openings, a link connecting one of the arms on said rock shaft and said bracket, and an extensible link connecting the other of said arms and the radial arm on said segmental gear.

In testimony whereof I affix my signature in presence of two witnesses.

JACOB WAMPFLER, Jr.

Witnesses:
  W. B. MOORE,
  F. McMANAMON.